July 22, 1958  R. S. COLE  2,844,044
ANTIFRICTION SCREW DEVICE
Filed Nov. 21, 1955  2 Sheets-Sheet 1

INVENTOR
RAYMOND S. COLE
BY Scrivener + Parker
ATTORNEYS

United States Patent Office 2,844,044
Patented July 22, 1958

2,844,044

ANTIFRICTION SCREW DEVICE

Raymond S. Cole, Los Angeles, Calif., assignor to Electrical Engineering & Manufacturing Corporation, Los Angeles, Calif., a corporation of California Application November 21, 1955, Serial No. 547,958

6 Claims. (Cl. 74—424.8)

This invention relates broadly to re-circulating ball bearing systems which are used to provide an anti-friction connection in mechanisms in which rotary motion is translated into linear or other motion such, for example, as steering mechanisms, jacks, power actuators for aircraft control surfaces, and the like.

It has been found that in re-circulating ball systems of the type to which this invention relates the efficiency of the system is decreased by the accumulation of tolerances and by discrepancies in the radii of the balls and the ball track. This decrease in efficiency may be reduced by increased accuracy in tolerances and by exact matching of the ball and ball track radii with, however, resulting increase in manufacturing costs. It has, therefore, been a principal object of this invention to provide simple, inexpensive and effective means for increasing the efficiency of such ball re-circulating systems and such means are provided by the invention described and claimed herein. It has been found that the invention provides an increase in efficiency even in systems which are carefully manufactured to provide minimum accumulation of tolerances and exact matching of ball and ball track radii.

The invention is described in the following specification and is illustrated in the accompanying drawing, in which—

Figures 1, 2, 3:
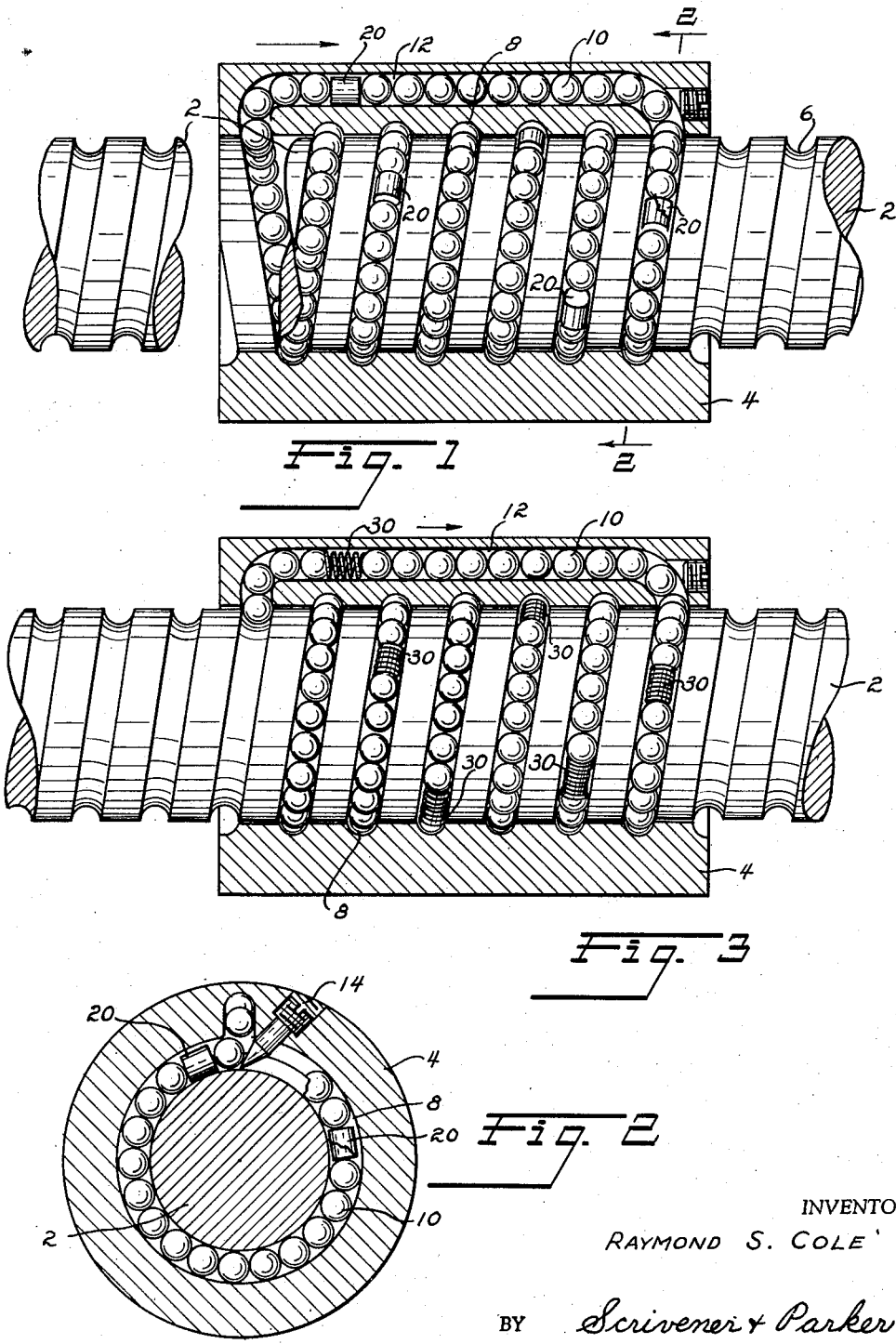
Fig. 1 is a longitudinal sectional view through the nut part of an anti-friction device for translating rotary to axial movement, and showing the shaft and balls in elevation.
Fig. 2 is a sectional view taken on line 2—2 of Fig. 1.
Fig. 3 is a view which is similar to Fig. 1 but which shows a modified form of the invention.

An anti-friction screw and nut connecting device, with which my invention is associated and useful, is shown in Figs. 1 and 2 and comprises a shaft 2, the outside diameter of which is somewhat less than the inside diameter of a nut 4 which surrounds and is associated with it. The shaft has a helical groove 6 in its outer surface which in cross section is slightly less than a semi-circle. The nut 4 has within its bore a complemental helical groove 8 which is inclined in the same direction as the groove in the shaft and has the same pitch or degree of inclination and which also has a cross section of slightly less than semi-circular shape. If no balls are in the grooves the nut may be moved lengthwise along the shaft without any relative rotation between them. If the complemental grooves of the nut and shaft are placed in coinciding relationship, however, the balls 10 are seated in both the nut and shaft grooves, these balls will interconnect the nut and shaft and transmit forces from one to the other. As the nut and shaft are rotated relatively to each other, the balls seated in the grooves of both members will also rotate and, being free to move relatively to both members, will roll along the shaft groove in the same direction as the nut turns, but at one-half the circumferential speed of the nut. As the nut moves axially along the shaft, therefore, the balls will not keep pace with it, so that the nut would progress past the balls one by one, unless some provision were made for preventing this. Because of this lag behind the nut in axial progression of the balls, means for re-circulating the balls is provided, as shown in Fig. 1, consisting of a by-pass passage 12 formed in the nut which communicates between two spaced portions of the nut groove. Between these portions the groove is filled with balls and beyond them at either end, no balls are present. In Fig. 2 there is shown a deflecting pin 14 which scoops the balls out of the shaft groove as the left end of passage 12 approaches them in the operation described in connection with Fig. 1. A similar pin blocks the complemental nut and shaft grooves adjacent the right end of passage 12 so that the balls will be guided back into such grooves, and when the direction of nut rotation is reversed this second pin acts to scoop the balls from the cooperating grooves into the by-pass passage 12, and the pin 14 guides the balls back into the nut and screw grooves.

As the nut 4 is rotated relatively to the shaft 2 in a clockwise direction as viewed from the right hand end of the shaft in Fig. 1, it will progress to the right, as shown by the arrow. The balls will also progress along the groove 6 of the shaft to the right, as indicated by the arrows, but at one-half the speed of the nut. With respect to the groove of the nut, therefore, the balls will be progressing in the opposite direction, i. e. to the left in Fig. 1, so that they move into the left end of the passage 12 and toward the right along that passage, to be fed into the nut groove ahead of the balls interengaged between the nut and screw past which the opening at the right end of passage 12 moves. Instead of the balls becoming permanently ineffective by passing out from between the screw and nut, therefore, they merely move into the by-pass passage 12 through which they are fed forward into a new position interengaged between the screw and nut. It will be evident that this re-circulation of the balls continues indefinitely during rotation of the nut clockwise relative to the screw, and the re-circulation will occur in the opposite direction when the direction of rotation of the nut is reversed.

The device and its mode of operation, which are described hereinbefore, are well-known and find use in many applications where it is necessary to translate rotary motion to linear or other motion, or vice-versa. The efficiency of such a device to transmit such motion will determine the torque required to cause a certain axial movement of the shaft under a certain load and it will be apparent that the efficiency of such a device will be most important in many applications. A typical application, in which efficiency is of great importance, is the translation of the rotary movement of the armature of an electric motor to the axially-movable shaft which operates an aircraft control surface, such as an aileron. In such an installation, the motor must be as small and light as possible and, in order to produce the very considerable axial force required at the shaft, the efficiency of the re-circulating ball connecting device must be such that this device itself will absorb a minimum amount of the torque produced by the motor.

Means are provided by this invention for increasing the efficiency of a re-circulating ball bearing connecting device of the type described hereinbefore. A preferred form of the invention is disclosed in Figs. 1 and 2 and, in this embodiment of the invention, solid cylindrical, resilient spacer members 20 are inserted in place of balls at spaced points along the entire length of the re-circulating system, including the complementary grooves 6, 8 and the connecting passage 12, and are so positioned that their axes lie in the direction of movement of the balls in the re-circulating system. The length of each cylindrical spacer is preferably approximately equal to the diameter of the balls being used in the re-circulating system and the diameter of each is less than that of the balls in either the normal or axially compressed position and condition of the spacers. The spacers are formed of a usual rubber material rather than a hard rubber and provide a certain amount of resilience between adjacent series of balls. I have found that good results may be obtained by using one spacer member for every 14 balls, i. e. there are 14 balls between adjacent spacer members. However, this ratio of the number of balls to spacer members may be increased or decreased and will depend on the amount of loading surface which may be sacrificed by substitution of spacer members for balls. Accordingly, the invention is not to be considered as limited in any way to any particular ratio between the number of balls and the number of spacer members.

A second embodiment of the invention is disclosed in Fig. 3 of the drawings and in this embodiment the spacer members take the form of cylindrical, helical compression springs 30 instead of the solid cylindrical rubber members disclosed in Figs. 1 and 2. In all respects other than the specific structure of the spacer members the embodiment of the invention disclosed in Fig. 3 is the same as that disclosed in Figs. 1 and 2.

Figure 4:
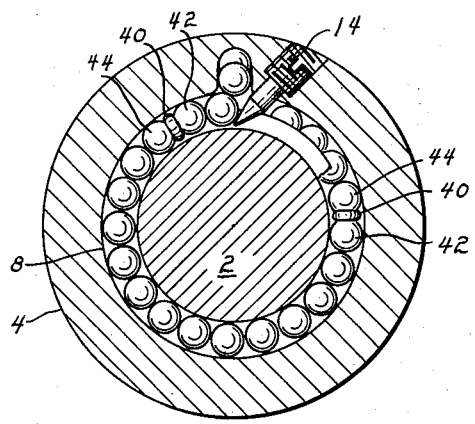
Fig. 4 is a fragmentary view of a device such as that shown in Fig. 1, showing a third embodiment of the invention.
Figure 5:
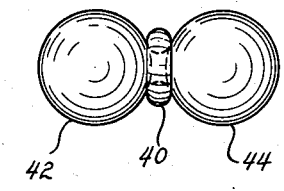
Fig. 5 is a side elevational view of two ball bearings and the spacer device shown in Fig. 4, the latter being shown in compressed condition.

A further embodiment of the invention is disclosed in Fig. 4, which is a fragmentary view of parts of a re-circulating ball bearing connecting device such as that disclosed in Figs. 1, 2 and 3, including the shaft 2 having groove 6, and nut 4 having the recirculating passage 12. In the embodiment disclosed in Figs. 4 and 5, the spacing device takes the form of a rubber annulus 40 which is of doughnut shape and which is disposed between adjacent balls 42, 44 with its general plane normal to the direction of travel of the balls. In this position, parts of the adjacent balls are received in the central opening in the spacer and the balls bear on opposite sides of the annular spacer. The ratio of balls to spacers is the same as described hereinbefore in connection with other embodiments of the invention. Normally the annular resilient spacers 40 hold adjacent balls apart, as shown in Fig. 4, but will expand radially to the position and condition shown in Fig. 5 when the adjacent, normally spaced balls are forced together, as shown in Fig. 5. The outer diameter of the spacers 40 is smaller than that of the balls both in the normal position and condition of the spacer, as shown in Fig. 4, and in the compressed and radially expanded condition and position, as shown in Fig. 5.

Figure 6:
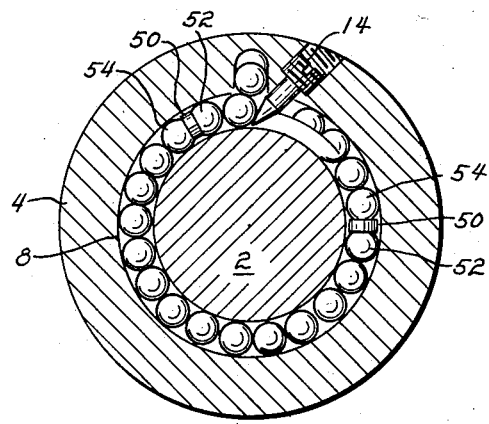
Fig. 6 is a fragmentary view similar to Fig. 4 and showing a fourth embodiment of the invention.
Figure 7:
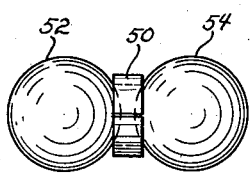
Fig. 7 is a view which is similar to Fig. 5, showing the spacer device of Fig. 6 in compressed condition.

A still further embodiment of the invention is disclosed in Figs. 6, 7 and takes the form of an annular split ring 50 which is disposed between adjacent balls 52, 54 and normally holds these balls apart but is radially expandable when adjacent balls are brought together, as shown in Fig. 7, because of the split condition of the ring. The diameter of the split ring spacer 50 is smaller than that of adjacent balls both in the normal condition and position of the device and in its radially expanded condition and position when adjacent balls are brought together.

The invention may be practiced and used with any type of ball bearing re-circulating connecting system, regardless of whether the balls are of uniform size throughout the system or are of alternately large and small diameters. When the invention is applied to any re-circulating system the efficiency thereof is increased and a much smoother flow and rotation of the balls is produced. While these advantages result from the application of the invention to any such system, they are particularly found in the use of the invention on systems using small diameter balls and in which the re-circulating system is relatively long. Further, the use of the invention is particularly advantageous in systems in which there is a large accumulation of tolerances and substantial discrepancies between the radii of the ball and ball track radii.

While I have described and illustrated certain forms which my invention may take, it will be apparent to those skilled in the art that other embodiments, as well as modifications of those disclosed, may be made and practised without departing in any way from the spirit or scope of the invention, for the limits of which reference must be made to the appended claims.

What is claimed is:

1. A force transmitting device comprising a shaft having a helical groove in its outer surface, a cooperating nut member surrounding the shaft and movable axially relatively thereto and having a helical groove in its bore which is complementary to the groove in the shaft, by-pass means defining with the grooves in the shaft and the cooperating nut member an orbit for guiding balls for re-circulation, a plurality of balls inter-engaged between the shaft and the nut in the grooves thereof and in said by-pass means for transmitting force between the shaft and nut, and cylindrical members disposed at intervals among said balls and having their axes in the direction of movement of the balls.

2. A force transmitting device comprising a shaft having a helical groove in its outer surface, a cooperating nut member surrounding the shaft and movable axially relatively thereto and having a helical groove in its bore which is complementary to the groove in the shaft, by-pass means defining with the grooves in the shaft and the cooperating nut member an orbit for guiding balls for re-circulation, a plurality of balls inter-engaged between the shaft and the nut in the grooves thereof and in said by-pass means for transmitting force between the shaft and nut, and cylindrical members formed of resilient material disposed at intervals among said balls and having their axes in the direction of movement of the balls.

3. A force transmitting device comprising a shaft having a helical groove in its outer surface, a cooperating nut member surrounding the shaft and movable axially relatively thereto and having a helical groove in its bore which is complementary to the groove in the shaft, by-pass means defining with the grooves in the shaft and the cooperating nut member an orbit for guiding balls for re-circulation, a plurality of balls inter-engaged between the shaft and the nut in the grooves thereof and in said by-pass means for transmitting force between the shaft and nut, and cylindrical resilient members disposed at intervals among said balls having their axes in the direction of movement of the balls and the length of each of which is approximately equal to the diameter of adjacent balls.

4. A force transmitting device comprising a shaft having a helical groove in its outer surface, a cooperating nut member surrounding the shaft and movable axially relative thereto and having a helical groove in its bore which is complementary to the groove in the shaft, by-pass means defining with the grooves in the shaft and the cooperating nut member an orbit for guiding balls for re-circulation, a plurality of balls inter-engaged between the shaft and the nut in the grooves thereof and in said by-pass means for transmitting force between the shaft and nut, and cylindrical resilient members disposed at intervals among said balls having their axes in the direction of movement of the balls and the length of each of which is approximately equal to the diameter of adjacent balls and the diameter of each of which is less than that of adjacent balls both in normal and fully axially compressed condition.

5. A force transmitting device comprising a shaft having a helical groove in its outer surface, a cooperating nut member surrounding the shaft and movable axially relatively thereto and having a helical groove in its bore which is complementary to the groove in the shaft, by-pass means defining with the grooves in the shaft and the cooperating nut member an orbit for guiding balls for re-circulation, a plurality of balls inter-engaged between the shaft and the nut in the grooves thereof and in said by-pass means for transmitting force between the shaft and nut, and cylindrical means each of which is resilient in the direction of its axis disposed at intervals among said balls and having their axes in the direction of movement of the balls.

6. A force transmitting device comprising a shaft having a helical groove in its outer surface, a cooperating nut member surrounding the shaft and movable axially relatively thereto and having a helical groove in its bore which is complementary to the groove in the shaft, by-pass means defining with the grooves in the shaft and the cooperating nut member an orbit for guiding balls for re-circulation, a plurality of balls inter-engaged between the shaft and the nut in the grooves thereof and in said by-pass means for transmitting force between the shaft and nut, and cylindrical rubber spacer members disposed at intervals among said balls and having their axes in the direction of movement of the balls.

References Cited in the file of this patent

UNITED STATES PATENTS

| 145,447 | Reigard | Dec. 9, 1873 |
| 1,905,039 | McKellar | Apr. 25, 1933 |
| 2,298,011 | Hoffar | Oct. 6, 1942 |